(12) United States Patent
Forster

(10) Patent No.: US 7,292,148 B2
(45) Date of Patent: Nov. 6, 2007

(54) METHOD OF VARIABLE POSITION STRAP MOUNTING FOR RFID TRANSPONDER

(75) Inventor: Ian J. Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 683 days.

(21) Appl. No.: 10/871,305

(22) Filed: Jun. 18, 2004

(65) Prior Publication Data

US 2005/0282495 A1 Dec. 22, 2005

(51) Int. Cl.
*G08B 13/14* (2006.01)
(52) U.S. Cl. .............................. 340/572.8; 340/572.1; 340/573.4; 340/572.4; 340/572.7; 340/572.6; 29/829; 343/700 MS; 343/895; 174/260; 174/255; 174/261; 156/60; 156/264; 235/451; 235/492
(58) Field of Classification Search .............. 340/572.1, 340/572.8, 572.2, 572.9, 572.4, 572.7, 568.1, 340/572.3; 343/700 MS, 895; 342/51; 235/451; 174/260, 255
See application file for complete search history.

(56) References Cited

U.S. PATENT DOCUMENTS

| | | | | |
|---|---|---|---|---|
| 5,223,851 A | * | 6/1993 | Hadden et al. | 343/873 |
| 5,564,888 A | | 10/1996 | Doan | |
| 5,585,193 A | | 12/1996 | Josephy et al. | |
| 6,019,865 A | * | 2/2000 | Palmer et al. | 156/265 |
| 6,100,804 A | * | 8/2000 | Brady et al. | 340/572.7 |
| 6,104,291 A | * | 8/2000 | Beauvillier et al. | 340/572.1 |
| 6,118,379 A | * | 9/2000 | Kodukula et al. | 340/572.8 |
| 6,133,834 A | * | 10/2000 | Eberth et al. | 340/572.5 |
| 6,145,901 A | | 11/2000 | Rich | |
| 6,236,223 B1 | | 5/2001 | Brady et al. | |
| 6,278,413 B1 | * | 8/2001 | Hugh et al. | 343/818 |
| 6,320,509 B1 | * | 11/2001 | Brady et al. | 340/572.7 |
| 6,369,712 B2 | * | 4/2002 | Letkomiller et al. | 340/572.1 |
| 6,412,086 B1 | * | 6/2002 | Friedman et al. | 714/733 |
| 6,535,175 B2 | | 3/2003 | Brady et al. | |
| 6,667,092 B1 | | 12/2003 | Brollier et al. | |
| 6,677,917 B2 | | 1/2004 | Van Heerden et al. | |

(Continued)

FOREIGN PATENT DOCUMENTS

EP 1 039 543 9/2000
WO WO 2005/073937 8/2005

OTHER PUBLICATIONS

Dubendorf, Dr. Very; RFID Radio Frequency Identification Technology Whitepaper, Aphanes Proserve 2001.

(Continued)

*Primary Examiner*—Marceau Milord
(74) *Attorney, Agent, or Firm*—Renner, Otto, Boisselle & Sklar, LLP

(57) ABSTRACT

A method of coupling an RFID chip to an antenna includes the steps of, iteratively until a test criterion is met, positioning an RFID chip relative to an antenna and testing the RFID chip and antenna. Once the test criterion is met, the RFID chip is coupled with the antenna. A method of coupling an RFID chip to one of a plurality of various antennas is also provided. A method of coupling an RFID chip to an antenna on an object is also provided.

63 Claims, 6 Drawing Sheets

U.S. PATENT DOCUMENTS

| | | | |
|---|---|---|---|
| 6,867,983 B2 * | 3/2005 | Liu et al. | 361/761 |
| 6,891,110 B1 * | 5/2005 | Pennaz et al. | 174/260 |
| 6,914,562 B2 * | 7/2005 | Forster | 343/700 MS |
| 6,925,701 B2 * | 8/2005 | Eckstein et al. | 29/602.1 |
| 6,940,408 B2 * | 9/2005 | Ferguson et al. | 340/572.7 |
| 7,057,562 B2 * | 6/2006 | Forster et al. | 343/700 MS |
| 7,075,437 B2 * | 7/2006 | Bridgelall et al. | 340/572.1 |
| 7,088,248 B2 * | 8/2006 | Forster | 340/572.7 |
| 7,120,987 B2 * | 10/2006 | Liu et al. | 29/600 |
| 7,158,037 B2 * | 1/2007 | Forster et al. | 340/572.8 |
| 2004/0075607 A1 | 4/2004 | Cathey | |

OTHER PUBLICATIONS

Radio Frequency Identification RFID A Glossary, AIM International White Paper, Document Version 1.1, AIM International, Inc. 1998.
Best, Dr. Steven; Antenna Performance and Design Considerations for Optimum Coverage in Wireless Communication Systems. Cushcraft Corporation, 1999-2002.

* cited by examiner

METHOD OF VARIABLE POSITION STRAP MOUNTING FOR RFID TRANSPONDER

BACKGROUND OF THE INVENTION

1. Field of the Invention

The present invention relates generally to the assembly of electronic devices. More particularly, the present invention relates to the assembly of radio frequency identification (RFID) straps interposers and/or tags.

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. Furthermore the RFID devices include structures to support and protect the antennas and electronics, and to mount or attach them to objects. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,292, all of which are hereby incorporated by reference in their entireties.

As noted above, RFID devices are generally categorized as labels or tags. RFID labels are RFID devices that are adhesively or otherwise attached directly to objects. RFID tags, in contrast, are secured to objects by other means, for example by use of a plastic fastener, string or other fastening means. In addition, as discussed below, as an alternative to RFID tags and labels it is possible to mount or incorporate some or all of the antennas and electronics directly on the objects. As used herein, the term "transponders" refers both to RFID devices and to RFID combinations of antennas and analog and/or digital electronics wherein the antenna and/or electronics are mounted directly on the objects.

In many applications the size and shape (form factor) of RFID devices, and mechanical properties such as flexibility, are critical. For reasons such as security, aesthetics, and manufacturing efficiency there is a strong tendency toward smaller form factors. Where thinness and flexibility are desired, it is important to avoid materials (such as bulky electronics) and constructions that add undue thickness or stiffness to the RFID tag or label. RFID devices on the other hand should have adequate electrical connections, mechanical support, and appropriate positioning of the components (chips, chip connectors, antennas). Structures for these purposes can add complexity, thickness and inflexibility to an RFID device.

Another significant form factor, for example in thin flat tags and labels, is the area of the device, and performance requirements of the antenna can affect this area. For example, in the case of a dipole antenna the antenna typically should have a physical length approximately one-half wavelength of the RF device's operating frequency. While the length of this type of antenna may be short for the operating frequency of an RF tag, it may still be larger than many desired RFID device form factors.

In many applications it is desirable to reduce the size of the electronics as small as possible. In order to interconnect very small chips with antennas in RFID inlets, it is known to use a structure variously called "straps", "interposers", and "carriers" to facilitate device manufacture. Straps include conductive leads or pads that are electrically coupled to the contact pads of the chips for coupling to the antennas. These pads may be used to provide a larger effective electrical contact area than a chip precisely aligned for direct placement without an interposer. The larger area reduces the accuracy required for placement of chips during manufacture while still providing effective electrical connection. Chip placement and mounting are serious limitations for high-speed manufacture. The prior art discloses a variety of RFID strap or interposer structures, typically using a flexible substrate that carries the strap's contact pads or leads. RFID devices incorporating straps or interposers are disclosed, for example, in U.S. Pat. No. 6,606,247 and in European Patent Publication 1 039 543, both of which are incorporated by reference herein in their entireties.

Another consideration is effectiveness of operation of RFID transponders in various operating environments and conditions. For example, operation of an RFID transponder may be affected by the composition of the surface to which it is mounted, the moisture content of the surface to which it is mounted, and various other aspects of an operating environment. Metallic objects in the operating environment, including other RFID transponders, can shift the resonant frequency of an RFID transponder thereby decreasing its effective range. Metallic objects may also reflect an RFID signal, and other objects, such as humans, may absorb RFID signals. Moisture content and/or humidity in the operating environment have further been known to adversely affect RFID transponder performance. While the effects of these materials and operating environment conditions may be avoided by removing them from the RFID operating environment, it is often not practical to do so. For example, when using an RFID transponder to track a package containing a metallic object, it may not be practical to remove the metallic object from the package to facilitate reading the RFID transponder.

Antennas of RFID transponders may be tuned to improve performance in various environments and conditions. One method of tuning an antenna is to provide an antenna with one or more additional conductor portions adjacent to the elements of the antenna. By adjusting the additional conductor portion length, width, and/or spacing distance, and/or the number of conductor portions, the antenna impedance can be changed. This may typically be done mechanically by adding or removing portions of the additional conductor portions and/or by connecting the additional portions with each other and the antenna. By varying the impedance of the antenna, the resonant frequency may be adjusted to compensate for operating environment conditions. However, this method is not well suited for high-speed, low cost implementation of RFID transponders because it may require adding or removing elements of an antenna and manipulation of more than one component.

A known way to form an RFID transponder on an object, such as a package is to mount or form one or more antennas directly on the object, then couple the electronics to the antenna. Various patented combinations of packages with RFID transponders produced in this manner include: U.S. Pat. No. 6,107,920 assigned to Motorola (FIGS. 14 and 15 show a package blank with directly formed antenna, and an RFID circuit chip secured to the package surface); U.S. Pat. No. 6,259,369 assigned to Moore North America (antenna sections printed in conductive ink on a package or envelope, with a label containing an RFID device bridging the antenna sections); and U.S. Pat. No. 6,667,092 assigned to International Paper (capacitive antenna having two pads separated by a gap embedded in packaging linerboard, with an interposer including an RFID processor coupled between the antenna pads). It is also known to incorporate this type of transponder in combination with fabric articles such as clothing, as shown in U.S. Pat. No. 6,677,917 assigned to Philips Electronics. In comparison with the production of RFID devices with antennas and electronics that have been predesigned for improved performance, however, this method of producing RFID transponders on objects suffers the shortcoming that the coupling of the electronics to the antenna may yield sub-optimal, inferior performance.

Therefore, it is desirable to provide a method of making an RFID transponder wherein the configuration of the transponder is dynamically altered to tune a desired characteristic of the transponder in response to various operating environment factors.

From the foregoing it will be seen there is room for improvement of RFID transponders and manufacturing processes relating thereto.

SUMMARY OF THE INVENTION

According to an aspect of the invention, a method of making a transponder that includes an chip and an antenna is provided. The method comprises, iteratively until a test criterion is met: positioning the chip and the antenna relative to each other to thereby configure the transponder; and testing the RFID transponder. Once the test criterion is met, the chip and the antenna are coupled.

According to another aspect of the invention, a method of making a transponder that includes an RFID chip and an antenna is provided. The method comprises, iteratively until a test criterion is met: positioning the chip and an antenna of an antenna structure containing a plurality of various antennas relative to each other to thereby configure the RFID transponder; and testing the transponder. Once the test criterion is met, the RFID chip and the antenna are coupled.

According to yet another aspect of the invention, a method of making a transponder that includes an RFID chip and an antenna on an object is provided. The method comprises: applying an antenna to the object; iteratively, until a test criterion is met: positioning the chip and the antenna relative to each other, to thereby configure the RFID transponder; and testing the RFID transponder. Once the test criterion is met, the RFID chip is coupled to the antenna.

According to still another aspect of the invention, a method of making a transponder that includes an RFID chip and an antenna on an object is provided. The method comprises: applying an antenna structure to the object, the antenna structure including a plurality of antennas; iteratively, until a test criterion is met: positioning the chip and an antenna of an antenna structure containing a plurality of various antennas relative to each other, to thereby configure the RFID transponder; and testing the transponder. Once the test criterion is met, the RFID chip and the antenna are coupled. In one embodiment the object comprises a package.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily according to scale.

DETAILED DESCRIPTION

A method of coupling an RFID chip to an antenna includes the steps of, iteratively until a test criterion is met, positioning an RFID chip relative to an antenna and testing the RFID chip and antenna. Once the test criterion is met, the RFID chip is coupled with the antenna. A method of coupling an RFID chip to one of a plurality of various antennas is also provided. A method of coupling an RFID chip to an antenna on an object is also provided.

Figure 1:
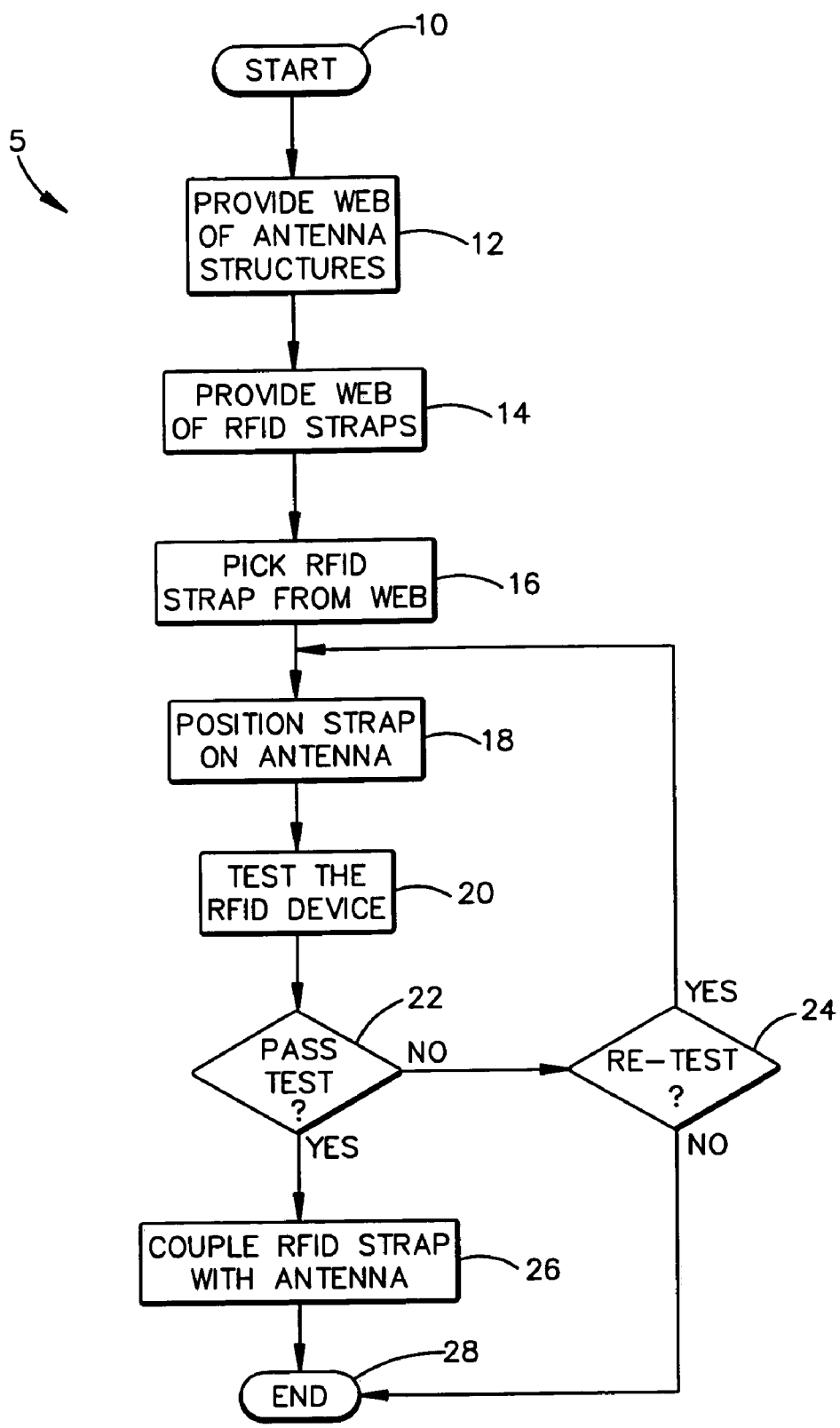
FIG. 1 is a flowchart showing a method of coupling an RFID strap to an antenna, according to the invention.

In FIG. 1, a flowchart depicting a method 5 of variable attachment of an RFID strap to an antenna is shown. The method 5 begins with providing a web of antenna structures in process step 12. The web of antenna structures may be a web of antenna structures as disclosed in commonly-assigned U.S. patent application Ser. No. 10/805,938. In process step 14, a web of RFID straps is provided. An individual RFID strap is picked, separated, or severed from the web of RFID straps and positioned on an antenna structure in process steps 16 and 18, respectively. Once the RFID strap is positioned on an antenna, the RFID transponder is tested in process step 20. In process step 22, if the test results satisfy a test criterion, the RFID strap is coupled to the antenna in step 26. If the test results do not meet the test criterion, the method diverts to process step 24 where a decision is made whether to revert to process step 18 or to terminate the method. If the decision is to terminate the method, the method ends at process step 28. If the decision is to revert to process step 18, the RFID strap is positioned on the antenna in a new position. The transponder is then tested in process step 20. The method continues until either the test results satisfy the test criterion, at which time the RFID strap is coupled to the antenna in process step 26, or the method is terminated via process step 24.

As described in more detail herein, because the electrical characteristics of a transponder, which includes the strap and the antenna, may be altered by varying the position of the strap and antenna with respect to each other, each time the strap and antenna are repositioned the resulting transponder may exhibit unique electrical characteristics. Thus, it will be appreciated that multiple "temporary" transponders may be configured and tested in process steps 18 and 20, respectively, before a transponder is produced that satisfies the test criteria in process step 22 and the strap is coupled with the antenna in process step 26.

It will be appreciated that there are two main classes of tests that may be performed when testing the RFID transponder. The first class includes tests that directly measure a parameter of the tag at the intended, or related RF frequency. The second class includes tests performed at the intended or related RF frequency that measure some parameter related to communication between the tag and reading system. Thus, testing the RFID transponder may include testing properties of the RFID transponder such as the resonant frequency, the frequency of maximum energy absorption, the frequency of maximum radiation coupling, reflection and/or re-radiation of RF energy in amplitude and/or phase, or a defined state of communication wherein the RFID transponder successfully carries out various tasks including reading data, writing data and any statistical measurement on such data communication, and/or other suitable parameters. The testing may involve direct measurement of the testing properties, or may involve indirect determination of such properties by measurement of other properties. It will be appreciated that by altering the alignment of the RFID strap to the antenna structure, one or more of the electrical properties of the RFID transponder may be altered. As previously mentioned, various operating environment conditions may interfere with the function of an RFID transponder. Thus, by testing various configurations of the RFID strap and antenna before coupling, the RFID transponder may be configured and assembled to operate more reliably in the given operating environment.

Testing the RFID transponder is generally performed when the strap is not fixed to the antenna (i.e., pre-attachment). The strap may be held by an applicator head and electrically coupled with the antenna structure for testing. However, mechanical coupling of the RFID chip or strap to the antenna structure generally will not occur until the test criteria are met. Various environmental conditions present during testing, such as the testing equipment itself, may interfere with or alter the performance and/or electrical properties of the RFID transponder. Further, the performance and/or electrical properties of an RFID transponder may vary between the pre-attachment and post-attachment assemblies. Therefore, the test criteria may be developed and selected to account for these variances.

For example, and as discussed in more detail below, when using a pressure sensitive adhesive (PSA) to capacitively couple an RFID strap to an antenna, the capacitance of the RFID transponder changes when the PSA is compressed (i.e., post-attachment). Such pre-attachment and post-attachment variations are typically predictable and may be determined theoretically or through testing, and accounted for during testing and/or assembly.

The term "test criterion," as used herein, includes a wide variety of criteria for acceptable performance. A test criterion may be a predetermined criterion, meeting some level of performance that is determined before testing. For example, the test criterion may be the frequency of maximum energy absorption is within some given percentage of a desired operating frequency of an RFID reader which is to read the RFID transponder.

Alternatively, a test criterion may include some result based on a comparison of various test results. Such a test criterion is referred to herein as a result comparison-based test criterion. For example, a result comparison-based test criterion may involve selecting a relative alignment position in which the frequency of maximum energy absorption is closest to an operating frequency for an RFID reader which is to read the RFID transponder. For result comparison-based criteria a suitable memory device may be used to record the various test results and alignment positions associated with each test result. Thus, for result comparison-based test criteria, the iterative positioning and testing process may involve a certain predetermined number of positioning and testing iterations, or a certain minimum number of positioning and testing iterations.

Test criteria may also involve a combination of predetermined criteria and result comparison-based criteria. For example, a predetermined criterion may be set for acceptance of the first test result. If the predetermined criterion is not met for the first test, the criterion may be relaxed in predetermined steps for each subsequent test, widening the range of results that would be considered acceptable. Results of previous tests and corresponding alignment positions may be maintained in a memory, to allow previous alignments to be returned to if they are acceptable under a relaxed acceptance criterion.

As will be described in greater detail below, a wide variety of types of re-positioning may be used in finding an acceptable alignment of strap and antenna. The strap may be translated and/or rotated a specified amount relative to contacts of an antenna. Alternatively, an antenna structure may include multiple types of antenna elements performance of which in conjunction with the strap may be tested in succession.

It will be appreciated that the method 5 may be terminated in process step 24 for a variety of reasons. For example, in some instances it may be impractical or impossible to satisfy a test criterion due to physical limitations of the strap and/or antenna, or due to a defective strap and/or antenna. In either situation, it may be advantageous to terminate the method before a test criterion is met. In other situations the method may be terminated by process step 24 after a given number of unsuccessful attempts to satisfy a test criterion. In still other situations, the method may be terminated by process step 24 because it is determined that a strap is not intended to be coupled with a particular antenna. For example, in the case of applying straps to antennas on products as discussed in more detail herein, some customers may require RFID devices to be integrated into the product and other customers may not. Thus, if the product is to be sent to a customer that does not require RFID transponders to be incorporated into the product, process step 24 can terminate the process prior to coupling a strap to the antenna.

Figure 2:
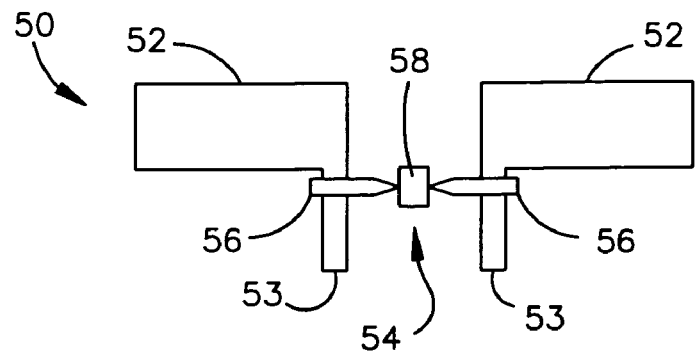
FIG. 2 is an plan view of an RFID transponder according to the invention.
Figure 3:
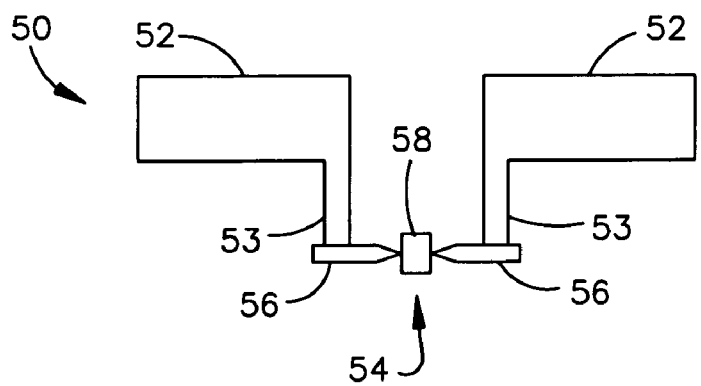
FIG. 3 is an plan view of an RFID transponder according to the invention.
Figure 4:
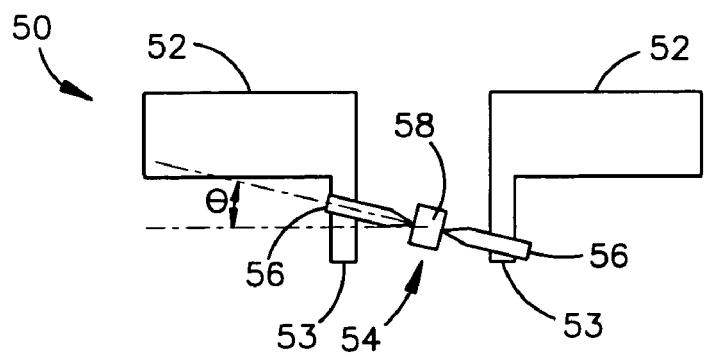
FIG. 4 is an plan view of an RFID transponder according to the invention.

Turning to FIGS. 2-4, various RFID transponders produced by the method of the present invention will be described. In FIG. 2, an RFID transponder 50 is shown. The RFID transponder 50 includes a strap 54 mounted to antenna portions 52. The strap includes a chip 58 and strap leads 56. The antenna portions 52 include extended bond portions 53 that enable a strap 54 to be coupled with the antenna portions 52 in a multitude of positions. In FIG. 2, the strap leads 56 of the strap 54 are coupled to the extended bond portions 53 of the antenna portions 52 in a first position. As shown in FIGS. 3 and 4, the strap 54 is coupled to the extended bond portions 53 of the antenna portions 52 in second and third alternative positions. The strap 54 may be coupled to the conductor by any of a variety of suitable methods, such as, by use of a conductive or non-conductive adhesive, by use of welding and/or soldering, or by electroplating.

It will be appreciated that the extended strap bond portions 53 allow attachment of the strap 54 in a virtually infinite variety of positions. Adjusting the relative position of attachment of the strap 54 to the antenna portions 52 alters the electrical properties of the RFID transponder 50 by effectively altering the antenna configuration. In the case of a simple dipole antenna, adjusting the strap position will tune the effective resonant frequency of the antenna. Thus, the position of attachment can be adjusted to compensate for variations in the operating environment such as moisture content or the package contents that may otherwise adversely affect the performance of the RFID transponder.

The configuration of the RFID transponders 50 shown in FIGS. 2-4 may be produced by the method of FIG. 1. For example, the RFID strap 54 may first be aligned with the extended strap bond portions 53 of antenna portions 52 as shown in FIG. 2. The RFID transponder 50 comprising the strap 54 and the antenna portions 52 will then be tested to determine whether the electrical properties of the transponder satisfy a test criterion. If the electrical properties are satisfactory, the RFID strap 54 will be coupled with the antenna portions 52 forming the RFID transponder 50 of FIG. 2. If, however, the electrical properties of the RFID strap 54 and the antenna portions 52 are not satisfactory, the RFID strap 54 is repositioned on the extended strap bond portions 53 of antenna portions 52. For example, the strap 54 may be repositioned as shown in FIG. 3. The configuration of the RFID transponder 50 shown in FIG. 3 will then be tested to determine whether the electrical properties of the RFID transponder 50 satisfy the test criterion. If the electrical properties of the RFID transponder 50 are satisfactory, the RFID strap 54 will be coupled with the antenna portions 52 to form the RFID transponder 50. If the electrical properties are not satisfactory, the RFID strap 54 may again be repositioned on the extended strap bond portions 53 of the antenna portions 52. For example, in FIG. 4, the RFID strap 54 is positioned on the extended strap bond portions 53 of the antenna portions 54 at a strap attach angle θ, forming another configuration of the RFID transponder 50. The process will continue until the electrical properties of the RFID transponder 50 are satisfactory, at which time the RFID strap 54 is coupled in any suitable manner with the antenna portions 52.

It will be appreciated that the position of the strap 54 on the antenna portions 52 may be varied in any suitable direction including the X-axis, Y-axis, and strap angle θ. The extended strap bond portions 53 shown in the figures may allow a wider range of variation of strap attach positions but extended strap bond portions are not required. Other types of antenna structures in addition to dipole antennas may also be used such as patch, slot and loop antennas.

Figure 5:
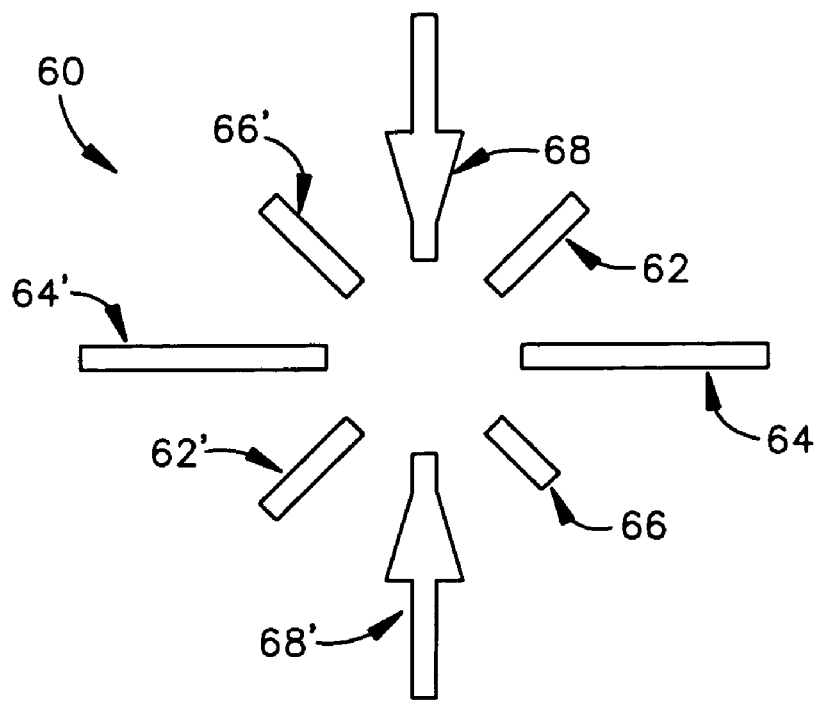
FIG. 5 is an plan view of an RFID transponder according to the invention.
Figure 6:
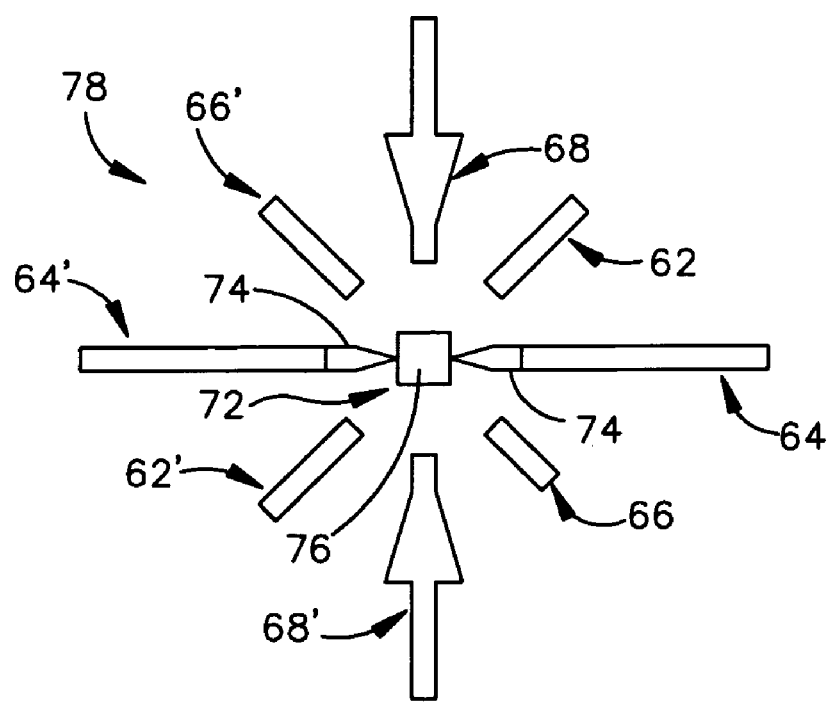
FIG. 6 is an plan view of an RFID transponder according to the invention.

Turning now to FIGS. 5 and 6, another RFID transponder produced according to a method of the present invention will be described. In FIG. 5, an antenna structure 60 includes several complementary antenna portions: 62 and 62', 64 and 64', 66 and 66', 68 and 68'. Each pair of antenna portions represents a different antenna design which, when coupled to an RFID strap, will exhibit different electrical properties such as frequency of maximum energy absorption, frequency of maximum radiation coupling, and/or resonant frequencies. In FIG. 6, an RFID strap 72 having strap leads 74 and a chip 76 is shown coupled to antenna portions 64 and 64'. The RFID strap 72 may be coupled to any one pair of complementary antenna portions depending on which antenna portions provide the most suitable electrical properties.

For example, with reference to process steps 18, 20, and 22 of the method 5 shown in FIG. 1, the RFID strap 72 may first be aligned with antenna portions 62 and 62'. The RFID transponder 78 comprising the RFID strap 72 and the antenna portions 62 and 62' will then be tested to determine whether the electrical properties of the RFID transponder 78 satisfy a test criterion. If the electrical properties of the RFID transponder 78 are satisfactory, the RFID strap 72 will be coupled with the antenna portions 62 and 62'. If the test results do not satisfy the test criterion, a determination is made in process step 24 whether to continue testing various combinations of the strap and antenna structures or to terminate the method. If the determination is made to cease testing, the process ends at process step 28. If the testing is to continue, the process reverts to process step 86, and the RFID strap 72 is repositioned, for example, onto antenna portions 64 and 64'. The RFID transponder 78 comprising the strap 72 and antenna portions 64 and 64' will then be tested to determine whether the electrical properties of the RFID transponder satisfy a predetermined criterion. If the electrical properties of the RFID transponder are satisfactory, the RFID strap 72 will be coupled with the antenna portions 64 and 64'. If the electrical properties are not satisfactory, a determination is made in process step 24 whether to continue testing various combinations of the strap and antenna structures or to terminate the process. The process will continue until the electrical properties of the RFID transponder are satisfactory or a determination is made to cease testing in process step 24.

It will be appreciated that the RFID strap 72 of the present embodiment may also be repositioned with respect to a pair of complementary antenna elements on the antenna structure in the manner described previously in connection with FIGS. 2-5. That is, the RFID strap position with respect to a pair of complementary antenna portions may be adjusted in any suitable manner such as the X-axis, Y-axis, or strap angle □, to allow an even greater variety of configurations to be achieved.

Figure 7:
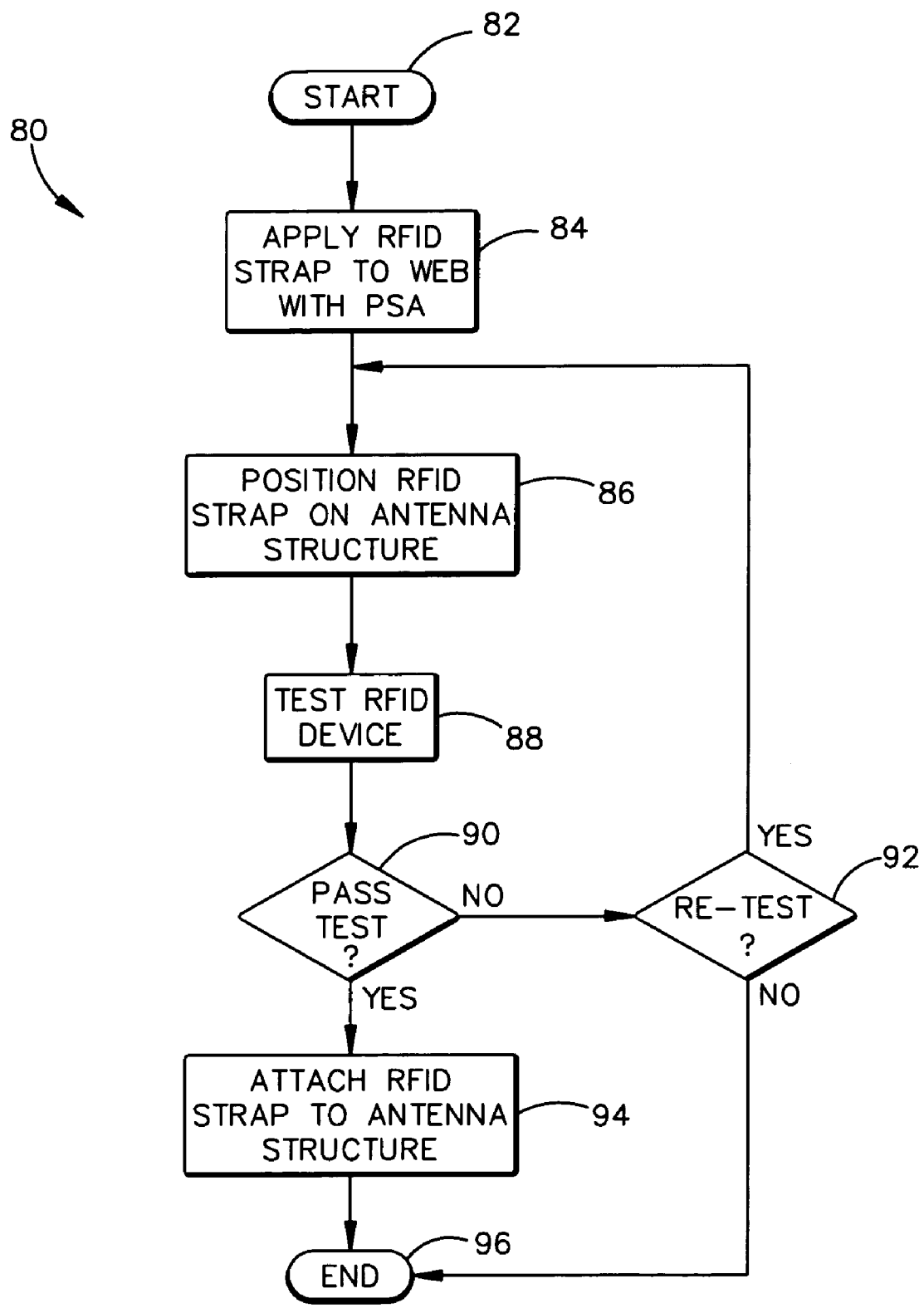
FIG. 7 is a flowchart showing a method of coupling an RFID strap to an antenna using a pressure sensitive adhesive according to the invention.

In FIG. 7, a flow chart depicting a method 80 of variable attachment of an RFID strap to an antenna using pressure sensitive adhesive (PSA) is shown. In process step 84, an RFID strap is applied to a label substrate containing a PSA. The label substrate containing the RFID strap is then positioned on the antenna structure in process step 86. In process step 88, the RFID transponder is tested. If the test results are satisfactory, the RFID strap is coupled to the antenna structure via the PSA label in process step 94. If the test results are not satisfactory a determination is made in process step 92 whether to continue testing various combinations of the strap and antenna or to terminate the method. If the determination is made to cease testing, the process ends at process step 96. If the testing is to continue, the process reverts to process step 86. The process continues until the test results are satisfactory and the RFID strap is coupled with the antenna structure in process step 94 or until the method is terminated at process step 96.

Figure 8:
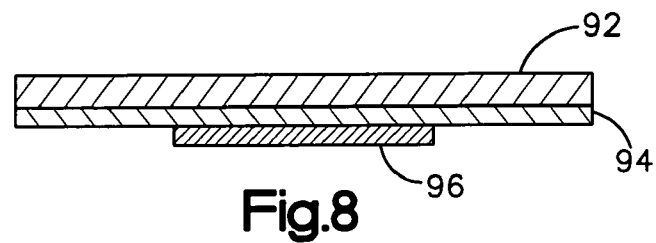
FIG. 8 is a cross-sectional view of an RFID strap on a label substrate according to the invention.
Figure 9:
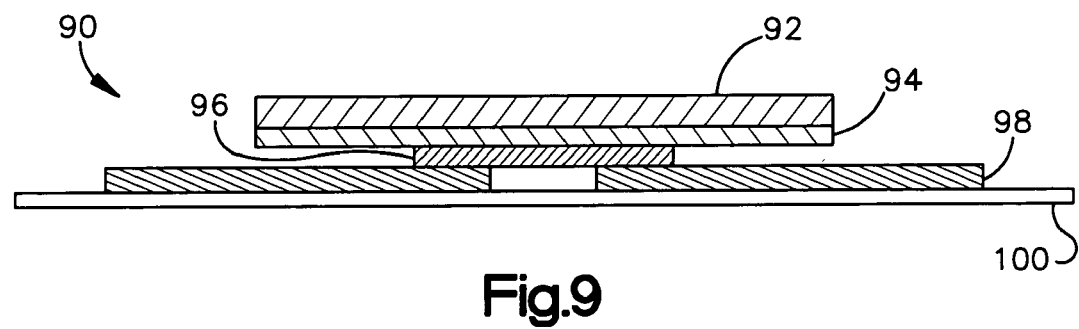
FIG. 9 is a cross-sectional view of an RFID transponder according to the invention.
Figure 10:
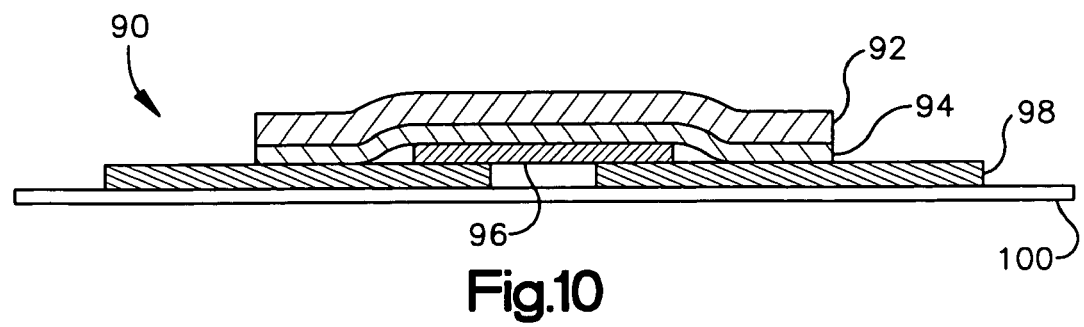
FIG. 10 is a cross-sectional view of an RFID transponder according to the invention.

Turning to FIGS. 8-10, an RFID transponder 90 produced by the method 80 of FIG. 7 will be described. FIG. 8 shows a label substrate 92 containing a PSA layer 94 and an RFID strap 96. The label substrate 92 may be larger than the RFID strap 96 to facilitate attaching the strap 96 to the antenna structure. In FIG. 9, the RFID strap 96 on the label substrate 92 is positioned facing the antenna structure 98 formed on the antenna substrate 100. In this position, the label substrate 92 and RFID strap 96 are not coupled to the antenna structure 98 and may be repositioned and tested in accordance with process steps 86 and 88 until the test results are satisfactory. Once the test results are satisfactory, the label substrate 92 and RFID strap 96 are coupled to the antenna structure by applying pressure to the PSA layer 94. FIG. 10 shows the finished RFID transponder 90 with the label substrate 92 adhered to the antenna structure 98 and/or antenna substrate 100 thereby coupling the RFID strap with the antenna structure.

It will be appreciated that in the present embodiment the RFID strap 96 is conductively coupled to the antenna structure 98. The RFID strap or chip may alternatively be reactively coupled to the antenna structure. For example, the RFID strap or chip may be capacitively coupled to the antenna structure by forming a thin dielectric layer on the strap 96 and/or antenna structure 98 in the location of attachment. One method of forming a thin dielectric layer would be to use titanium or aluminum for the strap leads of the RFID strap and to oxidize the surface of the strap leads. Alternatively, a thin dielectric layer of titanium dioxide or barium titanate may be applied to the surface by conventional printing techniques.

Reactive coupling of the RFID strap or chip to the antenna structure may be advantageous under circumstances where conductive coupling may be difficult to achieve. For example, conductive coupling may be difficult to achieve in environments where contaminants are present. The contaminants may interfere with achieving a conductive coupling by preventing adequate conductor to conductor contact. In contrast, reactive coupling may be relatively unaffected by the presence of contaminants because conductor to conductor contact is not necessary.

As previously stated, the pre-attachment and post-attachment electrical properties of an RFID transponder may vary. In the present embodiment, the pre-attachment state of the RFID transponder when the PSA is not compressed will have a lower capacitance, and therefore a higher operating frequency, than the corresponding post-attachment state of the RFID transponder. Thus, because the RFID transponder is tested in the pre-attachment state, the test criterion may be adjusted as appropriate to ensure that the electrical properties of the RFID transponder in the post-attachment state are satisfactory.

Figure 11:
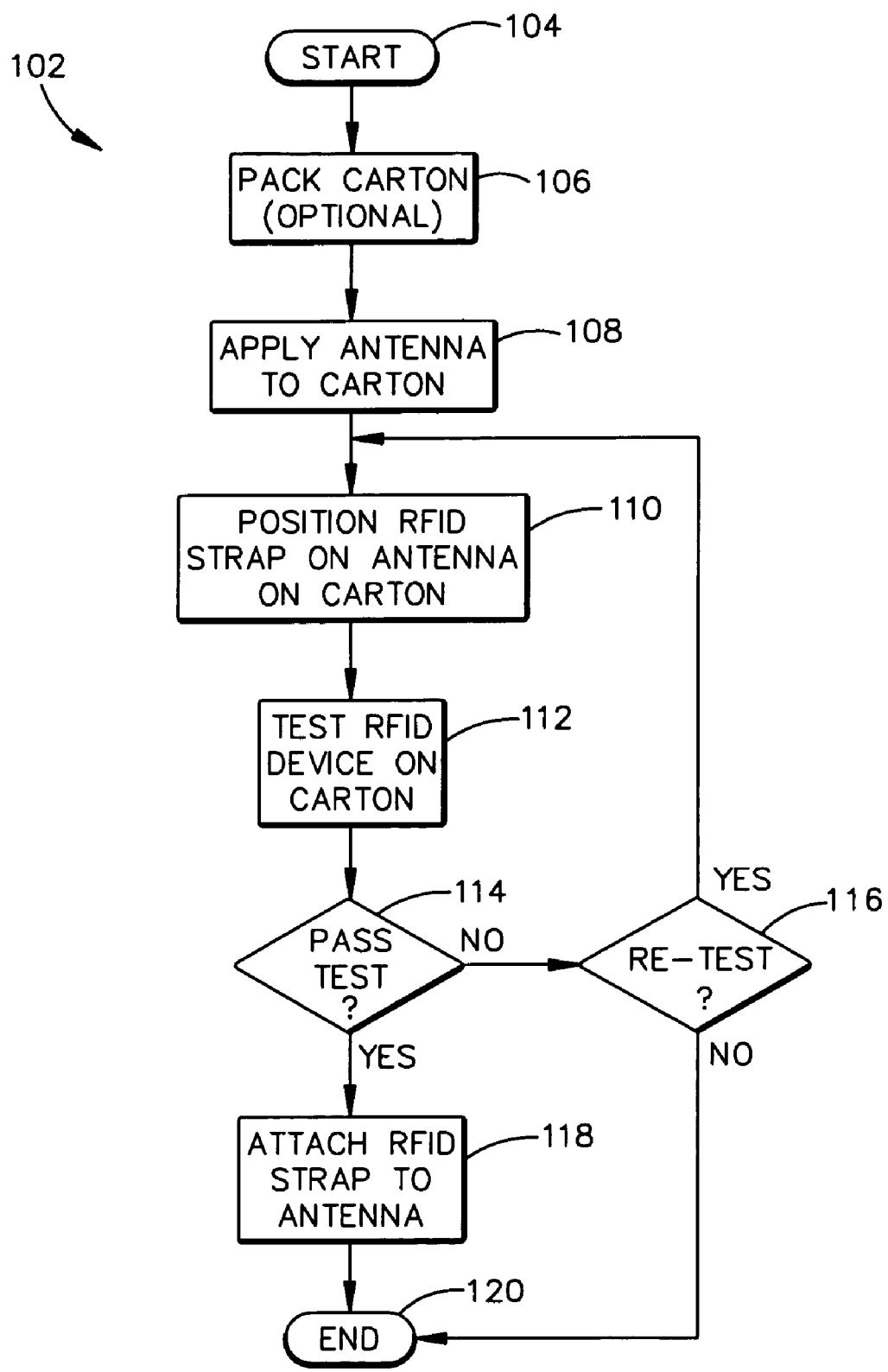
FIG. 11 is a flowchart showing a method of coupling an RFID strap to an antenna according to the invention.

In FIG. 11 a flow chart depicting a method 102 of variable attachment of an RFID strap to an antenna on a package is shown. While method 102 depicts variable attachment of an RFID strap to an antenna on a package, it will be appreciated that the method 102 is suitable for variable attachment of an RFID strap to an antenna on a wide variety of objects, surfaces, and materials other than packages. In process step 106, a package is provided. As discussed in more detail herein, the package may be empty or optionally filled with contents. In process step 108, an antenna structure is applied to the package or formed on the package in any suitable manner. For example, the antenna may be printed directly to the package or may be affixed to a label that is adhered to the package. Alternatively, the antenna structure may be inserted or formed into the sheet material to be used for construction of the package. For example, an antenna may be inserted between the plies of a corrugated cardboard sheet that is subsequently formed into a cardboard box. The antenna structure may be one of the antenna structures previously described, or may alternatively be any suitable antenna structure. In process step 110, an RFID strap is positioned to the antenna on the carton in a first configuration. The RFID strap and antenna are then tested in process step 112 to determine whether the electrical properties of the RFID and antenna configuration satisfy a test criterion. If the electrical properties of the RFID transponder are satisfactory, in step 114 the RFID strap is coupled with the antenna. If, however, the electrical properties are determined to be unsatisfactory, a determination is made in process step 116 whether to continue testing various combinations of the strap and antenna or to terminate the method 102. If the determination is made to terminate the method 102, the method 102 ends at process step 120. If the testing is to continue, the process reverts to process step 110, and the RFID strap is repositioned. The process continues until the test results are satisfactory and the RFID strap is coupled with the antenna structure in process step 118 or until the method is terminated at process step 120.

It will be appreciated that because various operating environment conditions may affect performance of an RFID transponder, the variable strap attach methods previously set forth may be advantageous for assembling and testing an RFID transponder in place on a package after the package has been filled with its contents. As set forth previously, the contents of a package or object may adversely affect the operation of an RFID transponder. By varying the position of a strap with respect to an antenna structure, the resonant frequency of the RFID transponder and various other electrical properties of the RFID transponder can be altered to compensate for interference from the contents of a package and/or other various operating environment conditions such as the positioning of the contents within the package, the moisture content of the contents within the package, the moisture content of the package itself, the position of the RFID transponder on the package, etc.

It will further be appreciated that the method of the present embodiment may also be performed prior to filling a package. In some cases, the contents of the package may have little or no effect on the operation of the RFID transponder and thus it may be less advantageous to configure the RFID transponder after the package has been filled. In cases where the contents of the package will not affect RFID transponder performance, the RFID transponder may be assembled prior to filling the package.

It will be appreciated that the methods of the present invention may be used for attaching an RFID strap to an antenna on a wide variety of objects. The embodiments set forth are but a few of the numerous applications of the present invention. The methods of the present invention may be used in connection with virtually any object, material, or surface. For example, the present invention may be used in connection with incorporating an RFID transponder into clothing, shoes, electronics, motor vehicles, etc.

The positioning process step and the testing process step of any of the above-described methods may be performed substantially continuously. For example, an applicator head holding a strap may be "swept" across an antenna, simultaneously testing and repositioning the RFID strap with respect to the antenna until a predetermined criterion is reached. Similarly, an antenna may be "swept" past an applicator head while the applicator head tests the RFID transponder configuration. Continuous alignment, realignment, and testing of the strap on the antenna may be advantageous for high-speed operations.

Certain modifications and improvements will occur to those skilled in the art upon a reading of the foregoing description. It should be understood that the present invention is not limited to any particular type of wireless communication device, or straps. Further, a wide variety of antenna designs may be used with the present invention such as loop, slot, or patch antennas. For the purposes of this application, couple, coupled, or coupling may encompass both mechanical coupling and electrical coupling. Mechanical coupling includes physically securing the strap to an electronic component. Electrical coupling includes forming an electrical connection between the strap and electronic component. An electrical connection includes directly connecting or reactively coupling a strap to an electronic component. Reactive coupling is defined as either capacitive or inductive coupling, or a combination of both. Capacitive coupling may involve putting the strap into close proximity with an electronic component, with dielectric pads therebetween, to allow capacitive coupling between the strap and the electronic component. The dielectric pads may include a non-conductive adhesive, such as a pressure-sensitive adhesive, for example Fasson adhesives S4800 and S333 available from Avery Dennison Corporation, and a high dielectric constant material, such as a titanium compound, for example titanium dioxide or barium titanate. The dielectric pads have an effective dielectric constant that is a non-constant function of thickness of the dielectric pads. For example, the dielectric pads may include conductive particles, such as aluminum and/or nickel particles, to minimize the effect of changes in thickness on the capacitive coupling. The dielectric pads may have a thickness of about 0.025 mm (0.001 inches) or less.

The methods of the invention, though described in relation to coupling RFID straps to antennas, may be advantageous for coupling chips directly to antennas. For example, in any of the above embodiments, a chip may be substituted for a strap and coupled directly to an antenna.

One of ordinary skill in the art will recognize that there are different manners in which these elements can accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of making a transponder that includes an RFID chip and an antenna, the method comprising:
   iteratively, until a test criterion is met:
      positioning the chip and the antenna relative to each other, to thereby configure the RFID transponder; and
      testing the RFID transponder;
   once the test criterion is met, coupling the RFID chip to the antenna.

2. The method of claim 1, wherein the test criterion includes a predetermined test criterion.

3. The method of claim 1, wherein the test criterion includes a result comparison-based test criterion.

4. The method of claim 1, wherein the antenna is a dipole antenna comprising two antenna portions.

5. The method of claim 4, wherein at least one of the two antenna portions includes at least one extended strap bond portion.

6. The method of claim 1, wherein the antenna includes a slot antenna.

7. The method of claim 1, wherein the antenna includes a loop antenna.

8. The method of claim 1, wherein the antenna includes a hole antenna.

9. The method of claim 1, wherein the RFID chip is part of an RFID strap that includes strap leads mounted to the chip.

10. The method of claim 1, wherein the positioning the chip and the antenna relative to each other includes adjusting the position of the chip and antenna relative to each other in a first direction.

11. The method of claim 1, wherein the positioning the chip and the antenna relative to each other includes adjusting the position of the chip and antenna relative to each other in a second direction.

12. The method of claim 1, wherein the positioning the chip and the antenna relative to each other includes adjusting the attach angle between the chip and the antenna.

13. The method of claim 1, wherein the testing includes determining the resonant frequencies of the transponder.

14. The method of claim 1, wherein the testing includes determining the frequency of maximum energy absorption of the transponder.

15. The method of claim 1, wherein the testing includes determining the frequency of maximum radiation coupling of the transponder.

16. The method of claim 1, wherein the testing includes determining the reflection and/or re-radiation of RF energy in amplitude and/or phase of the transponder.

17. The method of claim 1, wherein the testing includes testing the communication properties of the transponder.

18. The method of claim 1, wherein the positioning and testing is performed simultaneously.

19. A method of making a transponder that includes an RFID chip and an antenna, the method comprising:
   iteratively, until a test criterion is met:
      positioning the chip and an antenna of an antenna structure containing a plurality of various antennas relative to each other, to thereby configure the RFID transponder; and
      testing the transponder;
   once the test criterion is met, coupling the RFID chip with the antenna.

20. The method of claim 19, wherein the test criterion includes a predetermined test criterion.

21. The method of claim 19, wherein the test criterion includes a result comparison-based test criterion.

22. The method of claim 19, wherein the RFID chip is part of an RFID strap that includes strap leads mounted to the chip.

23. The method of claim 19, wherein the antenna structure includes a plurality of various dipole antennas.

24. The method of claim 19, wherein the testing includes determining the resonant frequencies of the transponder.

25. The method of claim 19, wherein the testing includes determining the frequency of maximum energy absorption of the transponder.

26. The method of claim 19, wherein the testing includes determining the frequency of maximum radiation coupling of the transponder.

27. The method of claim 19, wherein the testing includes determining the reflection and/or re-radiation of RF energy in amplitude and/or phase of the transponder.

28. The method of claim 19, wherein the testing includes testing the communication properties of the transponder.

29. The method of claim 19, wherein the positioning and testing is performed simultaneously.

30. A method of making a transponder that includes an RFID chip and an antenna on an object comprising:
applying an antenna to the object;
iteratively, until a test criterion is met:
positioning the chip and the antenna relative to each other, to thereby configure the RFID transponder; and
testing the RFID transponder;
once the test criterion is met, coupling the RFID chip to the antenna.

31. The method of claim 30, wherein the test criterion includes a predetermined test criterion.

32. The method of claim 30, wherein the test criterion includes a result comparison-based test criterion.

33. The method of claim 30, wherein the antenna is a dipole antenna comprising two antenna portions.

34. The method of claim 33, wherein at least one of the two antenna portions includes at least one extended strap bond portion.

35. The method of claim 30, wherein the antenna includes a slot antenna.

36. The method of claim 30, wherein the antenna includes a loop antenna.

37. The method of claim 30, wherein the antenna includes a hole antenna.

38. The method of claim 30, wherein the RFID chip is part of an RFID strap that includes strap leads mounted to the chip.

39. The method of claim 30, wherein the positioning the chip and the antenna relative to each other includes adjusting the position of the chip and antenna relative to each other in a first direction.

40. The method of claim 30, wherein the positioning the chip and the antenna relative to each other includes adjusting the position of the chip and antenna relative to each other in a second direction.

41. The method of claim 30, wherein the positioning the chip and the antenna relative to each other includes adjusting the attach angle between the chip and the antenna.

42. The method of claim 30, wherein the testing includes determining the resonant frequencies of the transponder.

43. The method of claim 30, wherein the testing includes determining the frequency of maximum energy absorption of the transponder.

44. The method of claim 30, wherein the testing includes determining the frequency of maximum radiation coupling.

45. The method of claim 30, wherein the testing includes determining the reflection and/or re-radiation of RF energy in amplitude and/or phase.

46. The method of claim 30, wherein the testing includes testing communication properties.

47. The method of claim 30, wherein the object includes a package.

48. The method of claim 47, wherein the package is packed prior to coupling the RFID chip with the antenna.

49. The method of claim 30, wherein the object includes fabric.

50. The method of claim 30, wherein the positioning and testing is performed simultaneously.

51. A method of making a transponder that includes an RFID chip and an antenna on an object comprising:
applying an antenna structure to the object, the antenna structure including a plurality of antennas;
iteratively, until a test criterion is met:
positioning the chip and an antenna of an antenna structure containing a plurality of various antennas relative to each other, to thereby configure the RFID transponder; and
testing the transponder;
once the test criterion is met, coupling the RFID chip with the antenna.

52. The method of claim 51, wherein the test criterion includes a predetermined test criterion.

53. The method of claim 52, wherein the package is packed prior to coupling the chip with the antenna.

54. The method of claim 51, wherein the test criterion includes a result comparison-based test criterion.

55. The method of claim 51, wherein the chip is part of a strap that includes strap leads mounted to the chip.

56. The method of claim 51, wherein the antenna structure includes a plurality of various dipole antennas.

57. The method of claim 51, wherein the testing includes determining the resonant frequencies of the transponder.

58. The method of claim 51, wherein the testing includes determining the frequency of maximum energy absorption of the transponder.

59. The method of claim 51, wherein the testing includes determining the frequency of maximum radiation coupling of the transponder.

60. The method of claim 51, wherein the testing includes determining the reflection and/or re-radiation of RF energy in amplitude and/or phase of the transponder.

61. The method of claim 51, wherein the testing includes testing the communication properties of the transponder.

62. The method of claim 51, wherein the object includes a package.

63. The method of claim 51, wherein the positioning and testing is performed continuously.

* * * * *